April 23, 1929.  C. C. FARMER  1,709,903
FEED VALVE DEVICE
Original Filed March 4, 1926
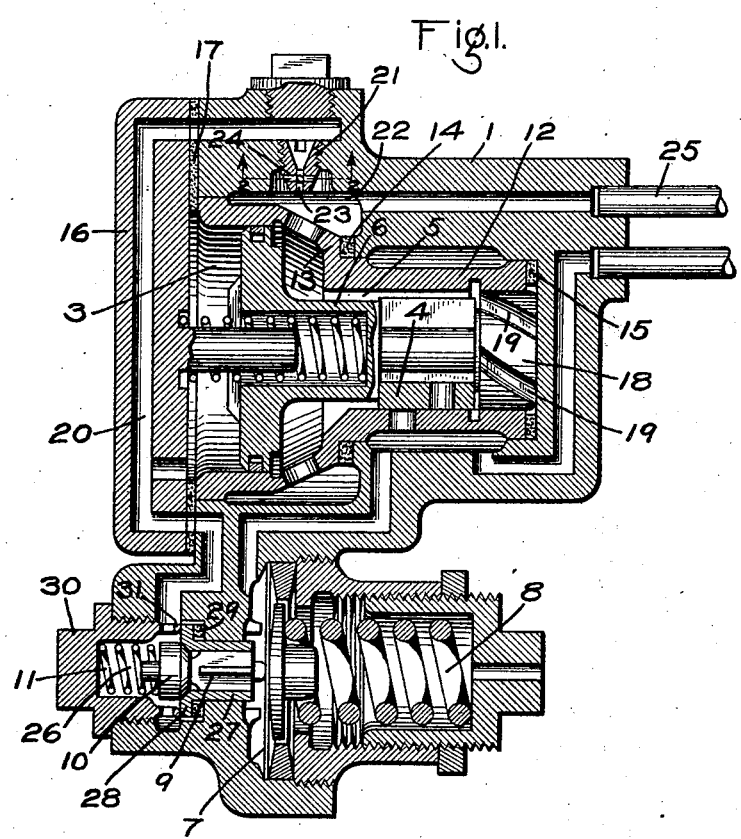
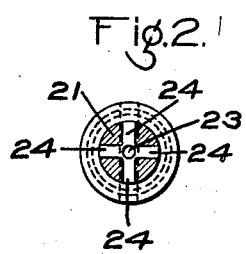
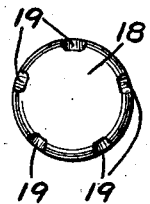
INVENTOR
CLYDE C. FARMER
BY *Wm. M. Cady*
ATTORNEY Patented Apr. 23, 1929.

1,709,903

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Original application filed March 4, 1926, Serial No. 92,180. Divided and this application filed November 20, 1926. Serial No. 149,669.

This invention relates to feed or reducing valve devices and more particularly to the type employed in railway service for maintaining the fluid pressure in the brake pipe of the fluid pressure brake system.

The present application is a division of my application, Serial No. 92,180, filed March 4, 1926.

In the accompanying drawing; Fig. 1 is a central sectional view of a feed valve device embodying my improvements; Fig. 2 a section on the line 2—2 of Fig. 1; and Fig. 3 an end view of the piston stem guiding means.

The feed valve device may comprise a casing 1 including a fluid pressure supply portion and a regulating portion. The supply portion includes a piston 2 contained in piston chamber 3 and a slide valve 4, contained in valve chamber 5 and adapted to be operated by piston stem 6, which is connected to piston 2.

The regulating portion comprises a flexible diaphragm 7, subject on one side to the pressure of an adjustable regulating spring 8. The stem 9 of a regulating valve 10 engages the opposite side of the diaphragm 7 and said valve is subject to the pressure of a coil spring 11.

According to one feature of my invention a one piece bushing 12 is provided for receiving the piston 2 and the slide valve 4. Said bushing is machined to provide a seat for the slide valve 4 and to receive the piston 2, and is provided with an annular flange 13 intermediate the ends of the bushing, for engaging a gasket 14. The outer end of the bushing also engages a gasket 15. The bushing 12 is maintained in place by the cap plate 16 and an interposed gasket 17.

The outer end of the piston stem 6 is provided with a guide portion 18 which fits a machined bore in the bushing 12 and which is provided with a plurality of spiral grooves 19.

A passage 20, which communicates with piston chamber 3, leads through the cap plate 16 and communicates, through a choke plug 21, with a chamber 22 in the casing 1. The choke plug 21 is provided with a central restricted port 23 and radiating from said port 23 at a point intermediate the ends are restricted ports 24. Chamber 22 is connected to the main reservoir (not shown) through pipe 25.

The passage 20 is connected to valve chamber 26 containing the regulating valve 10. The regulating valve 10 is carried in a bushing 27 having a seat for the valve and said bushing is provided with an annular flange 28 adapted to engage a gasket 29.

A cap nut 30 has screw-threaded engagement in the casing 1 and is disposed in alinement with the valve 10. Said cap nut is provided with an annular sleeve portion 31 which is adapted to engage the flange 28 of the bushing 27.

The bushing 27 is an easy fit in the casing 1, so that in case it should be desired to replace a bushing, the old bushing may be removed with the fingers and a new one installed. After the new bushing is installed, the plug 30 is applied and screwed down, the sleeve 31 serving as a gage to accurately adjust the bushing to a predetermined position with respect to the diaphragm 7. As a consequence, the valve 10 and its stem 9 will be properly positioned with respect to the diaphragm.

The one-piece bushing 12 may also be removed when desired and a new one installed, by merely taking off the cap plate 16, the bushing being a sufficiently loose fit in the casing, to permit the bushing to be easily removed by the hands of the operator.

The piston stem guide 18 is provided with the spiral grooves 19, so that while the grooves provide communication between the chambers at the opposite sides of the guide portion and the consequent maintenance of balanced fluid pressures on the guide portion, the spiral arrangement of the grooves prevents possible cutting of grooves in the bushing by the to and fro movement of the guide portion when the feed valve is operating, and furthermore, any particles of dirt or metal will be caught in the spiral grooves and will thus be prevented from getting between the guide portion and its bore in the bushing, which would otherwise cause possible cutting of the guide surfaces.

The provision of a plurality of restricted ports 24 in the choke plug 21 is for the purpose of ensuring an always open passage for the flow of air. If one or more of the ports 21 should become clogged with dirt or particles of foreign matter, there will still be an open port, through which air can flow. At the same time, the flow is limited to the predetermined rate as fixed by the restricted area of a single port and the restricted area of the central port 23.

Having now described my invention, what I claim as new and desire to secure by Letters Patent, is:—

1. A valve device comprising a piston, a slide valve, a piston stem connected to said piston for operating said valve, and a guide portion carried by said stem and provided with spiral grooves.

2. A fluid pressure valve device comprising a casing, a bushing mounted in said casing, a piston and slide valve mounted in said bushing, a piston stem for operating said valve, and a cylindrical guide portion carried by said piston stem and working in said bushing, and having a plurality of spirally arranged grooves.

3. A fluid pressure valve device comprising a casing, a one-piece bushing mounted in said casing and having a piston chamber and a valve chamber, a piston in said piston chamber, a valve in said valve chamber, said casing having an annular chamber surrounding the valve chamber portion of said bushing and an annular chamber surrounding the piston chamber portion of said bushing, the bushing being provided with openings connecting the valve chamber with the annular chamber surrounding said piston chamber portion, and a gasket interposed between said bushing and the casing in position to prevent leakage between the annular chambers of the casing.

4. A fluid pressure valve device comprising a casing, a one-piece bushing mounted in said casing and having a piston chamber and a valve chamber, a piston in said piston chamber, a valve in said valve chamber, said casing having an annular chamber surrounding the valve chamber portion of said bushing and an annular chamber surrounding the piston chamber portion of said bushing, the bushing being provided with openings connecting the valve chamber with the annular chamber surrounding said piston chamber portion, a gasket interposed between said bushing and the casing in position to prevent leakage between the annular chambers of the casing, and a gasket interposed beween the casing and the end of the valve chamber portion of the bushing to prevent leakage of fluid between the valve chamber and the annular chamber surrounding the valve chamber portion of the bushing.

5. A feed valve device comprising a casing having a valve chamber and a piston chamber, a supply valve in said valve chamber, a piston in said piston chamber for operating said valve, and a plug interposed in a supply passage in said casing, through which fluid under pressure is supplied to said piston chamber, said plug having a central vertically disposed restricted passage and radial restricted passages connecting the supply passage with said central passage.

In testimony whereof I have hereunto set my hand.

CLYDE C. FARMER.